United States Patent

Starer

[15] 3,676,736
[45] July 11, 1972

[54] AIRCRAFT FLASHER UNIT

[72] Inventor: Robert L. Starer, Rydal, Pa.
[73] Assignee: Physitech, Inc., Willow Grove, Pa.
[22] Filed: June 6, 1969
[21] Appl. No.: 831,113

[52] U.S. Cl.................315/241 R, 240/7.7, 315/241 S, 340/25
[51] Int. Cl................................................B64d 47/06
[58] Field of Search..............315/241 R, 241 S; 340/25; 240/7.7

[56] References Cited

UNITED STATES PATENTS

| | | | |
|---|---|---|---|
| 2,934,742 | 4/1960 | Tyrwhitt et al. | 340/25 |
| 3,031,645 | 4/1962 | Koontz | 340/25 |
| 3,519,984 | 7/1970 | Zychal | 315/241 R X |
| 3,526,821 | 9/1970 | Thomas | 315/241 R X |

*Primary Examiner*—Alfred L. Brody
*Attorney*—Paul & Paul

[57] ABSTRACT

Apparatus is disclosed which provides for the pulsing of a plurality of high intensity white lights, which lights are synchronized to flash simultaneously, and during the off period of navigation lights already installed on the airplane. Each high intensity light is controlled by a transistorized circuit coupled to the power supply lead which supplies the navigation light. Said circuit charges two storage capacitors and holds the charge on same during the on period of the navigation lights. During the off period of same, a short circuit is presented, causing a discharge of one of the capacitors, which acts to trigger the high intensity light, the burst of light being energized by the discharge of the other capacitor.

8 Claims, 3 Drawing Figures

PATENTED JUL 11 1972

INVENTOR.
ROBERT L. STARER
BY
*Paul & Paul*
ATTORNEYS.

INVENTOR.
ROBERT L. STARER
BY
Paul + Paul
ATTORNEYS.

AIRCRAFT FLASHER UNIT

BACKGROUND OF THE INVENTION

1. Field of the Invention

This invention lies in the field of aircraft navigation lights, and more particularly in the field of high intensity aircraft navigation lights.

2. Description of the Prior Art

For nighttime flying, aircraft are equipped with navigation lights which ordinarily present a steady light output, and which are generally placed on the tips of the wings and on the tail of the aircraft. It is highly desirable to have additional high intensity navigation lights which transmit a short impulse of high intensity light energy. The desirability of such lights lies in the penetrating characteristic of such high intensity white light. The high intensity burst of white light will carry with it an appreciably flat spectrum of frequencies, with the result that even if meteorological conditions filter out a segment of such frequencies, a portion of the light will nonetheless be propagated through the atmosphere. For this reason, it is particularly desirable to have such high intensity navigation lights when flying in inclement weather or other conditions where the field of vision is appreciably reduced. Where a plurality of high intensity navigation lights, commonly called strobes, are utilized on an aircraft, it is required by a regulation of the FAA that such strobes be synchronized to flash simultaneously.

Such high intensity navigation lights are commercially available and are in use on many aircraft. However, they present a serious drawback for the aircraft which is already equipped with the navigation lights, but not with the high intensity navigation lights. The commercially available units require independent wiring from the aircraft power supply out through the wings to the wing tips where the lights will be placed. Further, in order to synchronize the newly installed strobes, it is necessary to install a switching unit in a control area of the aircraft which operates on the power supply such as to give a pulsed power supply which is coupled to the strobes which are wired in parallel. In present commercial units, then, wires must be run from the center of the aircraft through and out to the end of each aircraft wing. This presents a substantial installation cost which causes the addition of high intensity navigation lights to be so expensive as to be economically unfeasible for many aircraft.

SUMMARY OF THE INVENTION

Apparatus is disclosed which provides a system for pulsing high intensity navigation lights for use on airplanes, which lights are synchronized to flash simultaneously and during the off period of the standard navigation lights, the apparatus requiring no independent power supply. The lights are coupled to and driven by the voltage supply which is delivered to the locations of the already installed navigation lights. The apparatus thus does not require any independent power supply, and particularly obviates any additional wiring from the point of installation to the location of the aircraft power supply. The voltage delivered to the standard navigation lights is caused to alternate periodically between a nominal positive supply value and zero. When said power supply voltage is at its non-zero value, it powers a step-up voltage circuit which generates a high voltage which in turn charges two capacitors, said charge to be used to trigger and energize the high intensity light. At the same time, the supply voltage is impressed on an electronic switch circuit which operates to present an open switch to the capacitors, thereby preventing their discharge. When the power supply voltage goes to zero, the switch circuit presents a closed switch, thereby enabling discharge of the capacitors, which discharge is caused to trigger and energize the high intensity light. The light is maintained in the on state for a brief period, after which the voltage supply becomes non-zero again, and the cycle repeats itself.

Accordingly, it is the primary object of this invention to provide a high intensity navigation light apparatus which permits the installation of high intensity navigation lights on aircraft without requiring any additional wiring from the location of such lights to the power supply of the aircraft.

It is a further object of this invention to provide apparatus for synchronizing high intensity navigation lights on an aircraft in the manner prescribed by Federal regulations.

It is a further object of this invention to provide high intensity navigation light apparatus utilizing the same power supply wiring as is installed for driving standard navigation lights.

DETAILED DESCRIPTION OF THE DRAWINGS

Figure 1:
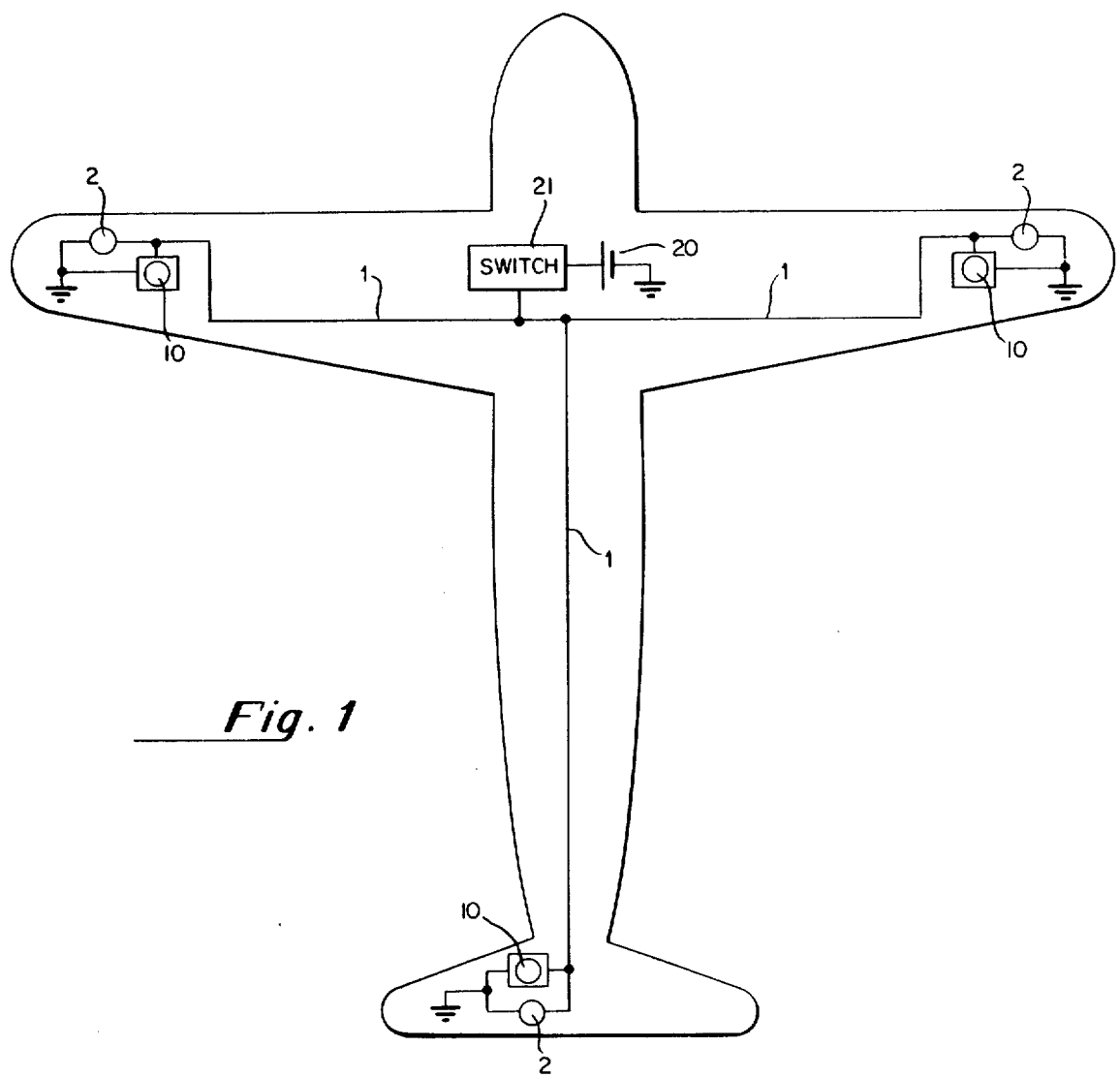
FIG. 1 is a schematic diagram of the wiring for both the standard navigation lights and the high intensity navigation lights.

FIG. 1 sets forth the overall wiring diagram showing the distribution of power to both the standard navigation lights and the strobes. Transmission leads 1 are presumed to have been previously installed for operation of the standard navigation light 2. The strobe lights 10, which are to be added to the aircraft, are located at or near the positions of the standard navigation lights 2, i.e., at the wing tips and on the tail. The power source 20 is coupled through a switch 21, the navigation lights and the strobes all being connected in parallel between the output of switch 21 and aircraft ground.

Figure 2:
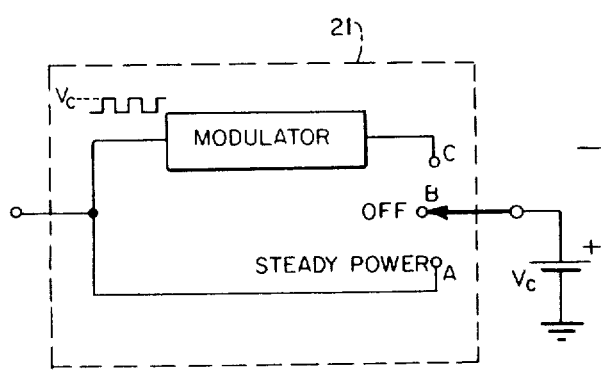
FIG. 2 is a schematic diagram of the switch installed at the location of the aircraft power supply with which to control the operation of the navigation lights.
Figure 3:
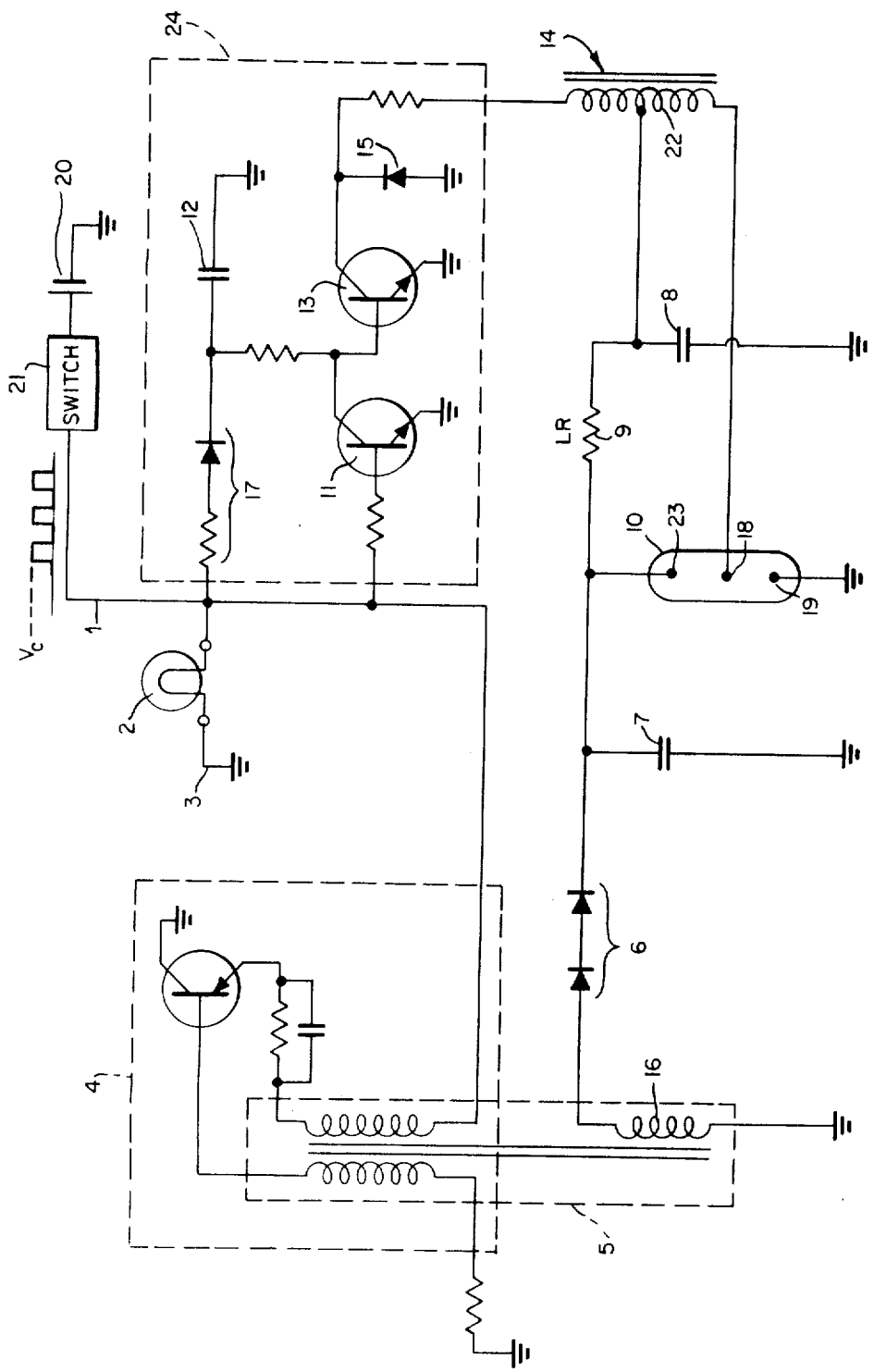
FIG. 3 shows a preferred embodiment of the high intensity navigation light pulsing circuit.

FIG. 2 shows in detail the operation of switch 21. The power supply voltage, $V_c$, is applied to a three-position switch. If steady power is desired to the standard navigation lights, without any activation of the strobes, this switch is placed on position A. If it is desired to have no power transmitted to any of the lights, the switch is placed on position B. If strobe operation is desired, the switch is placed on position C, in which case the voltage $V_c$ is coupled through a conventional modulator, or make-break circuit, which produces an output that is alternately zero volts and $V_c$. The value of $V_c$ during its alternate non-zero periods is typically +6 volts, but it could be designed to be any value. The make-break circuit can be set so that the navigation lights barely flick off, such as would occur if the zero duration were approximately 10 milliseconds. In this manner, the navigation lights would have the appearance of being continuously on. However, as will be seen below, even such a small off duration would be sufficient to trigger the strobe lights, which would flash simultaneously. The output terminal of switch 21 is coupled through to the navigation lights 2, through leads 1.

Turning now to the circuitry which controls the high intensity navigational lights, it is seen that voltage $V_c$ is coupled to oscillator 4, which is a conventional Hartley oscillator utilizing one transistor. Such oscillator, of course, develops an output signal only when the voltage c cis applied to it, this being only when navigation light 2 is on, in the embodiment illustrated. The output of such oscillator is coupled through transformer 5 to winding 16, the transformer providing a stepped up voltage across winding 16 which is typically in the order of 300 volts peak voltage. This voltage is halfway rectified through diode pair 6, causing capacitors 7 and 8 to charge up to a voltage of appreciably the peak voltage appearing across coil 16. Capacitor 7 charges directly through diode pair 6 and consequently reaches full charge in a very short time period. Capacitor 8 charges through a large resistance 9 which is typically of approximately 3.3 megohms. The time constant for charging capacitor 8 is measured appreciably by the value of large resistance 9 multiplied by capacitor 8, which time constant is limited only insomuch as it must be less than the time period during which lamp 2 is on. In the typical case, capacitor 8 is 0.01 microfarads, which combined with a large resistance 9 value of 3.3 megohms yields a time constant of 0.033 seconds, well within the typical "on" time period of navigation light 2.

Power supply voltage $V_c$ is also connected through a resistor diode combination 17 to a capacitor 12, and through a resistance 18 to a transistor 11. With $V_c$ at its non-zero value of typically +6 volts, transistor 11 is driven into saturation, in which state its collector is approximately 25 millivolts above ground. The collector lead of transistor 11 is coupled directly to the base terminal of transistor 13, a power transistor requiring approximately 0.5 volt bias to switch it on. Consequently, transistor 11 acts as a clamp to hold transistor 13 in an off condition, while capacitance 12 charges to slightly less than $V_c$. It is to be noted that transistor 13 is a power transistor capable of holding up to 500 volts from collector to emitter, and is not turned on by the voltage on capacitor 8. Thus, the quiescent condition at the end of the portion of the voltage cycle wherein $V_c$ is non-zero is manifested by a stored charge on capacitor 12, transistor 13 acting as an open switch preventing flow through transformer 14, and a stored charge on both capacitors 7 and 8.

High intensity navigation light 10 is typically a xenon tube designed to radiate short time duration pulses of high intensity light. It could be any commercially available high intensity flash-type bulb. In order to cause the light 10 to flash, a trigger pulse of or in excess of a threshold value must be applied to the xenon tube trigger input terminal 18, causing said xenon tube to ionize. Once having ionized, the tube will continue to conduct and transmit light so long as a threshold current is maintained through same. Such current would, in the tube illustrated, pass from terminal 23 to ground terminal 19. During the state of the circuit thus far described, the voltage developed at terminal 18 is insufficient to trigger the tube into conduction. Ionization is induced only by a high voltage at terminal 18, the level of which depends upon the type tube selected. A large voltage will be generated at terminal 18 only by a transient current through transformer 14 producing a variation of current with respect to the time sufficient to induce a large voltage in coil 22. Since capacitor 8 is charging continuously and relatively slowly through large resistor 9, no large voltage induction will be generated during the time period that $V_c$ is non-zero.

When switch 21 breaks connection to power supply 20, such that lead 1 carries no voltage, transistor 11 is immediately taken out of its saturation state, and becomes an open circuit from collector to ground. The charge stored in capacitor 12 cannot leak off through resistor diode combination 17, the diode being back-biased, but can discharge directly to ground through transistor 13 which is then forward biased to saturation by the large positive voltage impressed on its base by the charge on capacitor 12. With transistor 13 switched on such that it appears as an effective short to ground from collector to emitter, the charge on capacitor 8 can discharge directly through transformer 14 and transistor 13 to ground. There being very little resistance in this path, this discharge is very rapid, thereby inducing a high voltage across coil 22 of transformer 14. Said high voltage is impressed upon terminal 18, thereby firing the xenon tube 10. Once fired (ionized), the large charge on capacitor 7 will discharge through tube 10, thereby supplying the energy for the high intensity burst of light. The charge on capacitor 7 can discharge only through xenon tube 10, as the tube is an appreciably small resistance to ground compared to large resistance 9, or the back biased diode pair 6. Further, the time constant associated with this discharge is quite small. It will, of course, be determined by the choice of tube 10, but for most tubes commercially available, the discharge will be substantially complete in a matter of milliseconds. A diode 15 is placed in the circuit in parallel with transistor 13 to dampen oscillators.

Thus, at the moment that navigation light 2 turns off, the high intensity navigation light is triggered and emits a high energy burst of light for a time duration well within the period of time that the navigation light is off. It is to be noted that during this time, oscillator 4 is also off, there being no need to induce voltage across coil 16 during this period. At the termination of the off period for the navigation light, $V_c$ is again applied both to the navigation light and the high intensity light circuitry, at which time the cycle repeats itself, i.e., the oscillator turns on, capacitors 7 and 8 charge up fully, transistor 11 becomes a closed switch, and transistor 13 becomes an open switch.

Although the foregoing has described a particular embodiment of my invention, it is noted that many modifications and changes can be made without departing from the spirit and scope of the invention. Oscillator 4 can be of any conventional design, and can be designed to operate with virtually any impressed voltage. Although the use of a transformer to provide a stepped-up voltage is a very simple and stable method of achieving such high voltage, other conventional circuitry, such as choppers, could be utilized to obtain a stepped-up voltage with which to charge capacitors 7 and 8. Similarly, many variations of the switching circuit 24 are possible. Further, although the high intensity light has been illustrated as a xenon tube, any tube or lamp capable of emitting short bursts of high intensity light would be suitable. The circuitry for triggering and driving such light would necessarily be determined by the characteristics of said light. For instance, if the light chosen were to ionize or otherwise trigger at a relatively low voltage level across terminals 23 and 19, the stored voltage across capacitor 7 would be lowered accordingly. Further, in the event that it was desired to use a two terminal light, the triggering circuit would be modified in accordance with the triggering characteristics of such two terminal light. It is anticipated that said high intensity navigation lights will be placed wherever the navigation lights are located, this typically being on the wing tips and on the tail.

What is claimed is:

1. A system on an aircraft for synchronizing a plurality of high intensity navigation lights, to be operated with already installed navigation lights and utilizing the power supply provided to said navigation lights, comprising:
    a. aircraft power supply means to generate a periodic on-off voltage signal;
    b. transmission means, transmitting said voltage signal to the location of said navigation lights;
    c. oscillator means, coupled to and driven by said transmitted voltage signal;
    d. step-up voltage means, coupled to the output of said oscillator means, to generate a high voltage;
    e. charge storage means, coupled to and driven by said step-up voltage means;
    f. electronic switch means, the input of which is coupled to and driven by said transmitted voltage signal;
    g. transformer means, coupling said charge storage means to said electronic switch means;
    h. high intensity light means, having a trigger input terminal; and,
    i. coupling means, coupling said high intensity light means to said charge storage means and to said transformer means.

2. The invention as described in claim 1 wherein said electronic switch means include:
    a. a first transistor, having its base coupled to said transmitted voltage signal;
    b. a second transistor, having its base coupled to the collector of said first transistor;
    c. a capacitor, coupled resistively to the base of said second transistor;
    d. resistor-diode coupling means, coupling said transmitted voltage signal to said capacitor; and,
    e. diode means in parallel with said second transistor.

3. The invention as described in claim 2 wherein said charge storage means are comprised of:
    a. diode means to halfway rectify said high voltage;
    b. first capacitor means, coupled to and charged directly through said diode means;
    c. second capacitor means in series with a large resistor, the combination driven by said diode means.

4. The invention as described in claim 3 wherein said transformer means consists of a transformer coil which is coupled at a center tap to the high voltage side of said second capacitor means, one end of which is coupled to the output of said electronic switch means, and one end of which is coupled to the trigger input terminal of said high intensity light means.

5. A system on an aircraft for flashing a plurality of high intensity navigation lights, said flashing to be synchronized, and for controlling the operation of navigation lights, comprising:
   a. switching means, to control the mode of operation of said high intensity navigation lights and said navigation lights;
   b. voltage supply means, which couple to and drive said high intensity navigation lights and said navigation lights;
   c. electronic switch means;
   d. high intensity light means;
   e. charge storage means, coupled to said high intensity light means, to provide a short duration, high intensity discharge through same when it is triggered;
   f. trigger means, to trigger said high intensity light means;
   g. coupling means, coupling said alternating voltage supply means to said electronic switching means and said charge storage means; and,
   h. said electronic switching means cooperating with said trigger means and said charge storage means to cause said high intensity light means to flash during the alternate time periods that said navigation light is turned off.

6. The invention as described in claim 5 wherein said electronic switch means include:
   a. a first transistor, having its base coupled to said transmitted voltage signal;
   b. a second transistor, having its base coupled to the collector of said first transistor;
   c. a capacitor, coupled resistively to the base of said second transistor;
   d. resistor-diode coupling means, coupling said transmitted voltage signal to said capacitor; and,
   e. diode means in parallel with said second transistor.

7. The invention as described in claim 6 wherein
   a. said charge storage means include an oscillator, the output of same being transformer-coupled to obtain a stepped-up voltage, diode rectifier means driven by said stepped-up voltage to provide a rectified voltage, and a first high voltage storage capacitor driven by said rectified voltage to accumulate a large stored charge,
   b. which stored charge discharges through said high intensity light means when same is triggered to a conducting state.

8. The invention as described in claim 7 wherein said trigger means include a second high voltage storage capacitor coupled to said diode rectifier means through a resistor, and a transformer, said transformer being coupled
   a. at a center tap to said second high voltage storage capacitor,
   b. at one end thereof to the high intensity light means, and
   c. at the other end thereof to said electronic switch means, whereby to trigger said high intensity light means into a conducting state when said electronic switch means presents an effective short circuit to aircraft ground.

* * * * *

UNITED STATES PATENT OFFICE
CERTIFICATE OF CORRECTION

Patent No. 3,676,736    Dated July 11, 1972

Inventor(s) Robert L. Starer

It is certified that error appears in the above-identified patent and that said Letters Patent are hereby corrected as shown below:

Column 2, line 57, after "voltage", "c cis" should be --$V_c$ is--.

Signed and sealed this 17th day of October 1972.

(SEAL)
Attest:

EDWARD M. FLETCHER, JR.
Attesting Officer

ROBERT GOTTSCHALK
Commissioner of Patents